United States Patent
Huang et al.

(10) Patent No.: US 9,576,218 B2
(45) Date of Patent: Feb. 21, 2017

(54) SELECTING FEATURES FROM IMAGE DATA

(71) Applicant: CANON KABUSHIKI KAISHA, Tokyo (JP)

(72) Inventors: Hung Khei Huang, Irvine, CA (US); Bradley Scott Denney, Irvine, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 14/532,625

(22) Filed: Nov. 4, 2014

(65) Prior Publication Data
US 2016/0125260 A1    May 5, 2016

(51) Int. Cl.
*G06K 9/46* (2006.01)
(52) U.S. Cl.
CPC ................... *G06K 9/4671* (2013.01)
(58) Field of Classification Search
CPC ........................................................ G06K 9/46
See application file for complete search history.

(56) References Cited

U.S. PATENT DOCUMENTS

| | | | | |
|---|---|---|---|---|
| 6,711,293 | B1* | 3/2004 | Lowe | G06K 9/4671 382/219 |
| 8,004,576 | B2* | 8/2011 | Sharma | G06K 9/4642 348/222.1 |

(Continued)

FOREIGN PATENT DOCUMENTS

CN    102915540 A    2/2013

OTHER PUBLICATIONS

Lowe, et al. "Distinctive Image Features from Scale-Invariant Keypoints" International Journal of Computer Vision, 2004; pp. 1-28.*

(Continued)

*Primary Examiner* — Chan Park
*Assistant Examiner* — Mia M Thomas
(74) *Attorney, Agent, or Firm* — Fitzpatrick, Cella, Harper & Scinto (57) ABSTRACT

SIFT features are selected from an input image. A SIFT procedure is applied to the input image to obtain candidate keypoints. For each candidate keypoint, there is calculation of a first Laplacian value ($L_u$) for pixels in an upper Scale Space and a second Laplacian value ($L_l$) for pixels in a lower Scale Space, based on the position of the candidate keypoint. A candidate keypoint is discarded if a Laplacian value $L_c$ of the keypoint position is less than or equal to either of $L_u$ or $L_l$. In the case that the candidate keypoint is not discarded, the candidate keypoint's Laplacian strength ($L_s$) is calculated, based on a relative change in Laplacian value from $L_c$ to $L_u$ and from $L_c$ to $L_l$. One or more candidate keypoints are selected as SIFT features based on the corresponding Laplacian strength.

20 Claims, 6 Drawing Sheets

(56) References Cited

U.S. PATENT DOCUMENTS

| | | | | |
|---|---|---|---|---|
| 8,144,947 | B2* | 3/2012 | Kletter | G06K 9/00442 |
| | | | | 382/100 |
| 8,233,716 | B2* | 7/2012 | Kletter | G06K 9/4671 |
| | | | | 382/190 |
| 8,441,489 | B2* | 5/2013 | Chen | G06F 12/0897 |
| | | | | 345/505 |
| 8,755,837 | B2* | 6/2014 | Rhoads | G06F 17/30244 |
| | | | | 382/162 |
| 8,768,065 | B2* | 7/2014 | Melikian | G06K 9/4609 |
| | | | | 382/195 |
| 8,879,813 | B1* | 11/2014 | Solanki | G06T 7/0014 |
| | | | | 382/128 |
| 8,924,993 | B1* | 12/2014 | Niebles Duque | H04L 29/06462 |
| | | | | 725/9 |
| 9,177,225 | B1* | 11/2015 | Cordova-Diba | G06T 7/0081 |
| 9,317,778 | B2* | 4/2016 | Cordova-Diba | G06F 17/30247 |
| 2007/0217676 | A1* | 9/2007 | Grauman | G06K 9/4671 |
| | | | | 382/170 |
| 2008/0247651 | A1* | 10/2008 | Takaki | G06K 9/00818 |
| | | | | 382/219 |
| 2009/0202114 | A1* | 8/2009 | Morin | A63F 13/12 |
| | | | | 382/118 |
| 2009/0238460 | A1* | 9/2009 | Funayama | G06K 9/4671 |
| | | | | 382/181 |
| 2009/0324026 | A1* | 12/2009 | Kletter | G06K 9/00442 |
| | | | | 382/124 |
| 2009/0324087 | A1* | 12/2009 | Kletter | G06K 9/4671 |
| | | | | 382/195 |
| 2010/0080469 | A1* | 4/2010 | Liu | G06K 9/4671 |
| | | | | 382/201 |
| 2010/0150472 | A1* | 6/2010 | Chen | G02B 21/008 |
| | | | | 382/278 |
| 2010/0310174 | A1* | 12/2010 | Reznik | G06K 9/4642 |
| | | | | 382/190 |
| 2011/0110560 | A1* | 5/2011 | Adhikari | G06F 3/017 |
| | | | | 382/103 |
| 2011/0170780 | A1* | 7/2011 | Vaddadi | G06K 9/4671 |
| | | | | 382/190 |
| 2011/0194772 | A1* | 8/2011 | Sanjuan | G06T 15/04 |
| | | | | 382/190 |
| 2011/0317922 | A1* | 12/2011 | Chertok | G06K 9/4671 |
| | | | | 382/180 |
| 2012/0275712 | A1* | 11/2012 | Inaba | G06K 9/6211 |
| | | | | 382/201 |
| 2012/0301014 | A1* | 11/2012 | Xiao | G06K 9/4676 |
| | | | | 382/159 |
| 2013/0340000 | A1* | 12/2013 | Chen | H04N 21/812 |
| | | | | 725/35 |
| 2014/0099030 | A1* | 4/2014 | Kim | G06T 7/0042 |
| | | | | 382/199 |
| 2014/0193098 | A1* | 7/2014 | Su | G06T 7/0034 |
| | | | | 382/294 |
| 2014/0254942 | A1* | 9/2014 | Liu | G06F 17/30247 |
| | | | | 382/209 |
| 2015/0049943 | A1* | 2/2015 | Hamsici | G06K 9/4609 |
| | | | | 382/170 |
| 2015/0071524 | A1* | 3/2015 | Lee | G06T 7/0075 |
| | | | | 382/154 |
| 2015/0265144 | A1* | 9/2015 | Burlina | A61B 3/10 |
| | | | | 351/206 |
| 2015/0317820 | A1* | 11/2015 | Choi | G06T 15/08 |
| | | | | 382/132 |
| 2015/0347801 | A1* | 12/2015 | Svetal | G06K 7/10762 |
| | | | | 235/454 |
| 2016/0042250 | A1* | 2/2016 | Cordova-Diba | G06T 7/0081 |
| | | | | 382/180 |
| 2016/0042251 | A1* | 2/2016 | Cordova-Diba | G06T 7/0081 |
| | | | | 382/180 |
| 2016/0125260 | A1* | 5/2016 | Huang | G06K 9/4671 |
| | | | | 382/201 |
| 2016/0155014 | A1* | 6/2016 | Balestri | G06K 9/4671 |
| | | | | 382/201 |
| 2016/0292183 | A1* | 10/2016 | Cho | G06F 17/30554 |
| 2016/0292887 | A1* | 10/2016 | Cho | G06T 7/408 |

OTHER PUBLICATIONS

Lowe, D. "Distinctive Image Features from Scale-Invariant Keypoints", International Journal of Computer Vision, 2004, pp. 1-28.*

Lowe, "Distinctive Image Features from Scale-Invariant Keypoints", International Journal of Computer Vision, 2004.

U.S. Appl. No. 13/315,497, filed Dec. 9, 2011, Inventor: Dariusz Dusberger.

Australian Patent Application No. 2013-273790, filed Dec. 20, 2013, Inventor: Scott Rudkin.

* cited by examiner

SELECTING FEATURES FROM IMAGE DATA

FIELD

The present disclosure relates to selecting features from image data, and more particularly relates to selecting SIFT features from image data to represent an image.

BACKGROUND

In the field of image analysis and retrieval, it is common to extract local features of an image for comparison against extracted features of other images.

One approach previously considered for extracting local features is the Scale-Invariant Feature Transform (or SIFT) algorithm. Feature vectors extracted with SIFT are invariant to image translation, scaling, and rotation, are partially invariant to illumination changes, and are robust to local geometric distortion. Thus, they can be useful to represent an image for applications such as image matching.

SUMMARY

Generally, the process for extracting SIFT features involves creating "Scale Space" images, which are a collection of images obtained by progressively smoothing the images (i.e., reducing resolution). Differential coefficient images of the first order are calculated from the Scale Space images, and an edge mask is created for each Scale Space image. Gaussian convolution is performed to the edge masked differential coefficient images to calculate a Harris value and select keypoints as SIFT features.

One difficulty with the SIFT algorithm described above is that a large number of feature points may be generated for a given image. As the number of images in datasets grows, more memory and processing power are required, leading to higher hardware costs and degraded performance.

The foregoing situation is addressed by classifying SIFT keypoints using a Laplacian strength based on a relative change in Laplacian value between scale spaces, and reducing the amount of SIFT keypoints to be used by filtering out lower ranked (i.e., lower strength) keypoints.

Thus, in an example embodiment described herein, SIFT features are selected from an input image. A SIFT procedure is applied to the input image to obtain candidate keypoints. For each candidate keypoint, there is calculation of a first Laplacian value ($L_u$) for pixels in an upper Scale Space and a second Laplacian value ($L_l$) for pixels in a lower Scale Space, based on the position of the candidate keypoint. A candidate keypoint is discarded if a Laplacian value $L_c$ of the keypoint position is less than or equal to either of $L_u$ or $L_l$. In the case that the candidate keypoint is not discarded, the candidate keypoint's Laplacian strength ($L_s$) is calculated, based on a relative change in Laplacian value from $L_c$ to $L_u$ and from $L_c$ to $L_l$. One or more candidate keypoints are selected as SIFT features based on the corresponding Laplacian strength.

By classifying SIFT keypoints based on Laplacian strength and filtering out lower ranked keypoints, it is ordinarily possible to reduce the amount of required memory and processing power, and to thereby improve performance.

In one example aspect, $L_s$ is calculated at least in part from $L_u$ and one or more of $L_c/L_u$ and $L_c/L_l$. For example, in one aspect, $L_s$ is calculated by $L_s=(((L_c-L_l)/L_l)+((L_c-L_u)/L_u))/2$. In another example, $L_s$ is calculated by $L_s=[L_c-\max(L_l, L_u)]/\max(L_l, L_u)$. In still another example, $L_s$ is calculated by $L_s=[L_c-\min(L_l, L_u)]/\min(L_l, L_u)$. In yet another example, $L_s$ is calculated by $L_s=L_c/\max(L_l, L_u)$.

In another example aspect, the candidate keypoint is added to a list of keypoints sorted by descending Laplacian strength. In one example aspect, a number of top ranked keypoints are selected from the list. In yet another example aspect, the number of keypoints selected from the list is a specified percentage of the total number of keypoints. In still another example aspect, the number of keypoints selected from the list is a predetermined fixed maximum number of keypoints, and in one example, the predetermined fixed maximum number of keypoints is based on user input.

In yet another aspect, the selected keypoints are used to search for a corresponding image.

This brief summary has been provided so that the nature of this disclosure may be understood quickly. A more complete understanding can be obtained by reference to the following detailed description and to the attached drawings.

DETAILED DESCRIPTION

Figure 1:
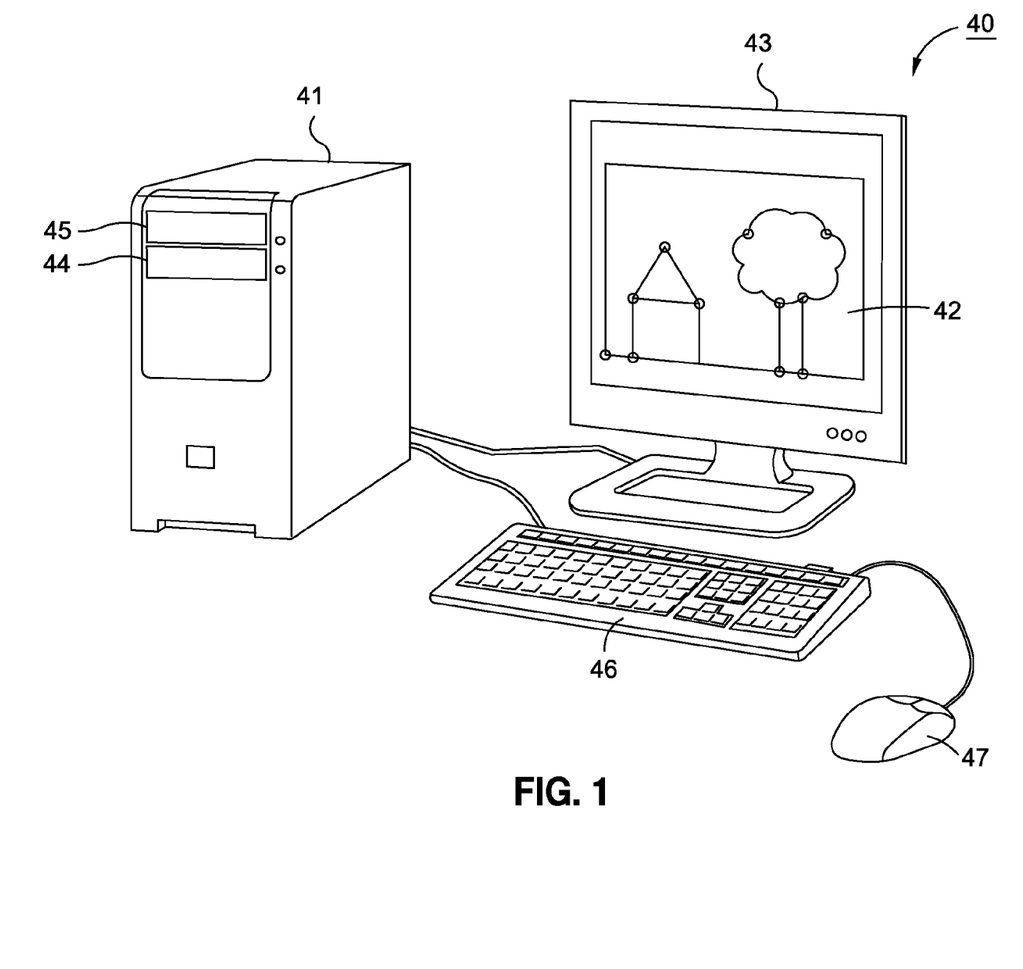
FIG. 1 is a representative view of computing equipment relevant to one example embodiment.

FIG. 1 is a representative view of computing equipment relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. Other devices for accessing information stored on removable or remote media may also be provided.

Host computer 41 may acquire digital image data from other sources such as a digital video camera, a local area network or the Internet via a network interface. Likewise, host computer 41 may interface with other output devices, such as image output devices accessible over a network interface.

Display screen 42 displays an image with selected feature points. The processes for selecting feature points for an image will be described more fully below.

While FIG. 1 depicts host computer 41 as a personal computer, computing equipment for practicing aspects of the present disclosure can be implemented in a variety of embodiments, including, for example, a digital camera, ultra-mobile computer, or netbook, among many others.

Figure 2:
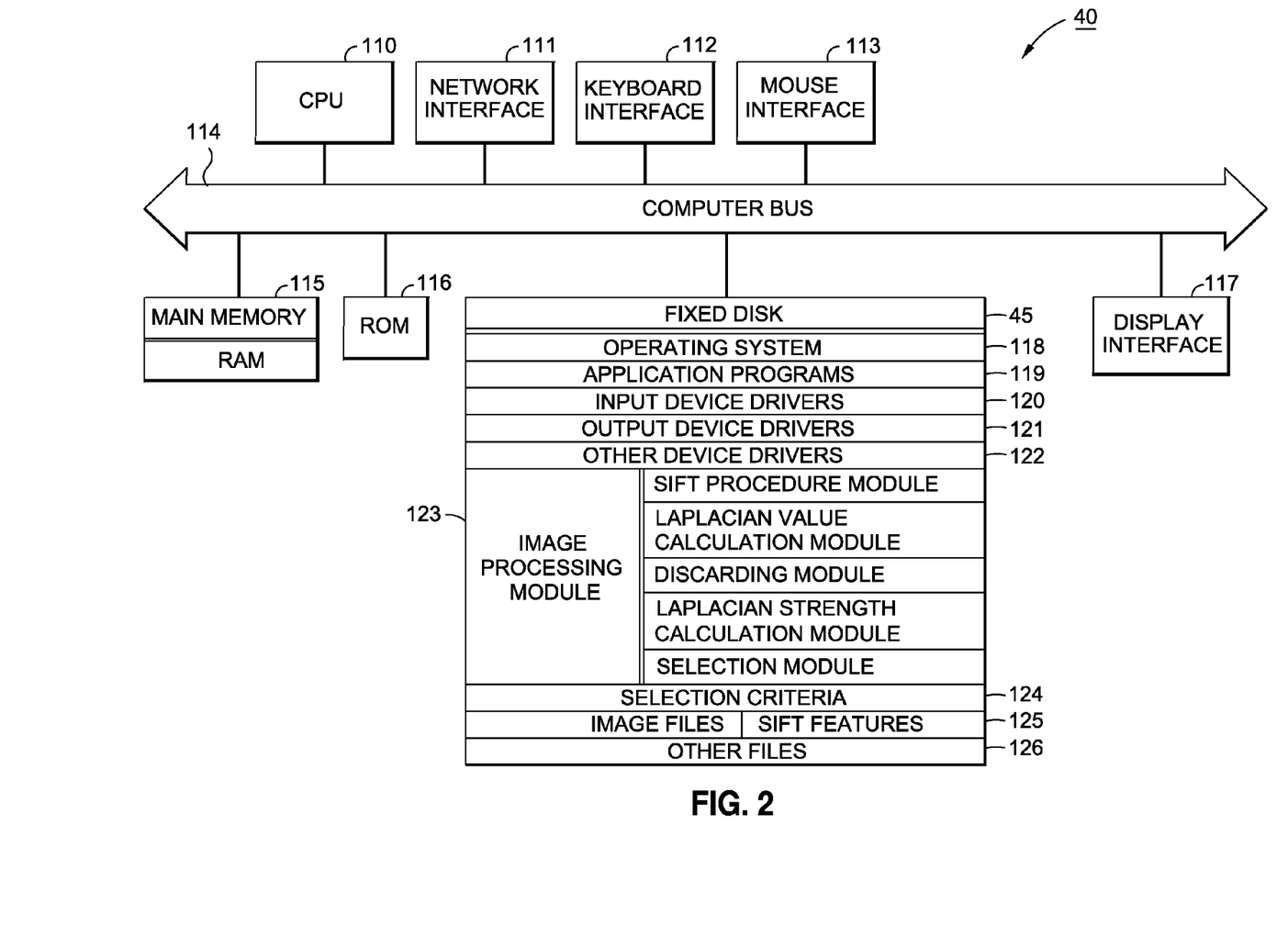
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 110 which interfaces with computer bus 114. Also interfacing with computer bus 114 are hard disk 45, network interface 111, random access memory (RAM) 115 for use as a main run-time transient memory, read only memory (ROM) 116, display interface 117 for monitor 43, keyboard interface 112 for keyboard 46, and mouse interface 113 for pointing device 47.

RAM 115 interfaces with computer bus 114 so as to provide information stored in RAM 115 to CPU 110 during execution of the instructions in software programs such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data such as color images or other information can be stored in RAM 115, so that the data can be accessed by CPU 110 during the execution of computer-executable software programs, to the extent that such software programs have a need to access and/or modify the data.

As also shown in FIG. 2, hard disk 45 contains computer-executable process steps for operating system 118, and application programs 119, such as graphic image management programs. Hard disk 45 also contains computer-executable process steps for device drivers for software interface to devices, such as input device drivers 120, output device drivers 121, and other device drivers 122. Selection criteria 124 may include rules for guiding how keypoints are selected from a list of keypoints ranked by Laplacian strength, such as a percentage or number of the top of the list, as discussed more fully below. Image files/SIFT features 125 is a database or other storage for image files and associated SIFT features which are obtained according to the embodiments described herein. Thus, in one example embodiment, image files/SIFT features 125 is a set of image files, such as color images files, in a searchable database, along with corresponding SIFT features. An example of searching such a database for matching images using SIFT features will be described more fully below with respect to FIG. 6. Other files 126 are available for output to color output devices and for manipulation by application programs.

Image processing module 123 comprises computer-executable process steps, and generally comprises a SIFT procedure module, a Laplacian value calculation module, a discarding module, a Laplacian strength calculation module, and a selection module. Image processing module 123 inputs an image, and outputs one or more selected candidate keypoints as SIFT features. More specifically, image processing module 123 comprises computer-executable process steps executed by a computer for causing the computer to perform a method for selecting such keypoints as SIFT features, as described more fully below.

The computer-executable process steps for image processing module 123 may be configured as a part of operating system 118, as part of an output device driver, or as a stand-alone application program such as an image management system. They may also be configured as a plug-in or dynamic link library (DLL) to the operating system, device driver or application program. For example, image processing module 123 according to example embodiments may be incorporated in an output device driver for execution in a computing device, embedded in the firmware of an output device, in an input/output device such as a camera with a display, or provided in a stand-alone image management application for use on a general purpose computer. It can be appreciated that the present disclosure is not limited to these embodiments and that the disclosed image processing module 123 may be used in other environments in which SIFT feature selection is used.

Figure 3:
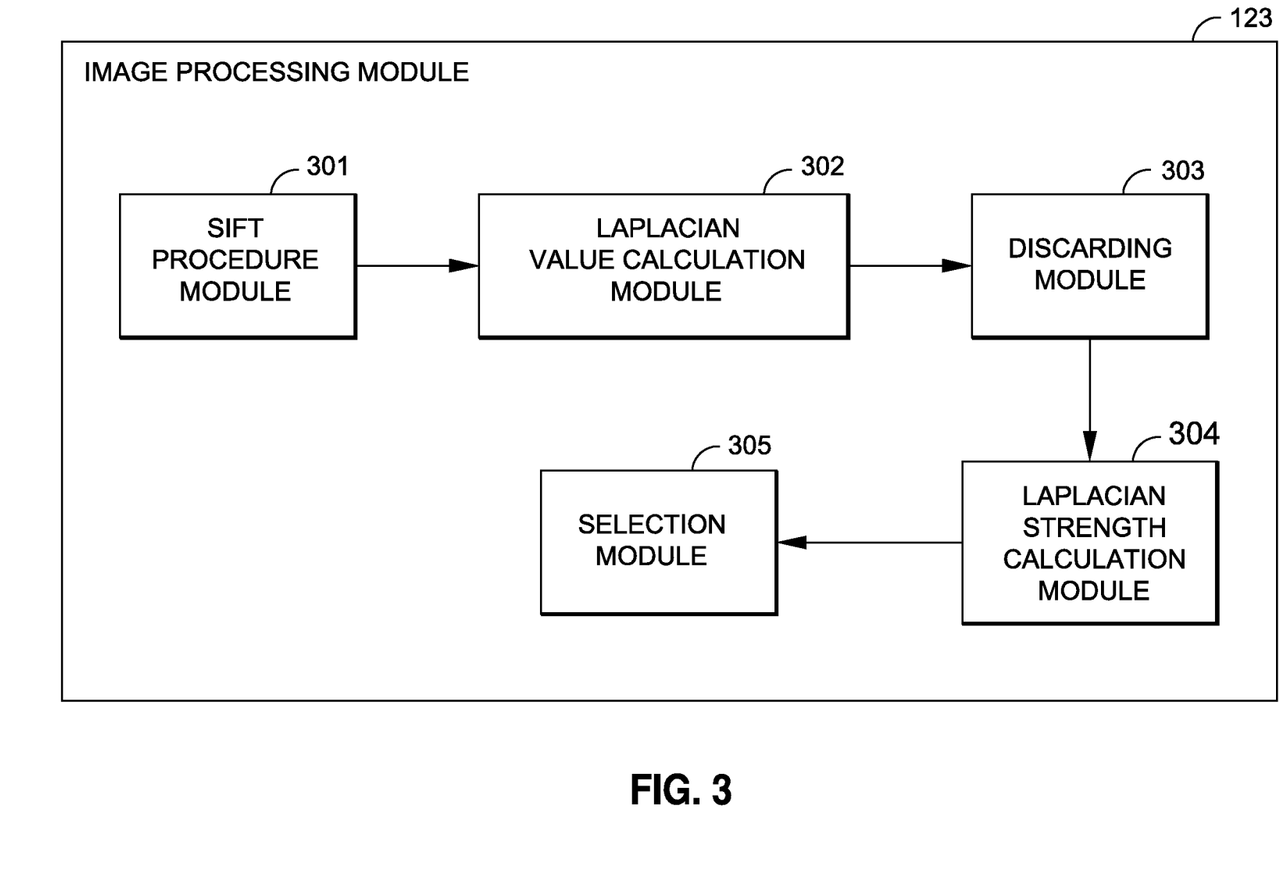
FIG. 3 is a representational view of an image processing module according to an example embodiment.

FIG. 3 illustrates the image processing module of FIG. 2 according to an example embodiment.

In particular, FIG. 3 illustrates an example architecture of image processing module 123 in which the sub-modules of image processing module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, image processing module 123 includes a SIFT procedure 301 which applies SIFT to an input image to obtain candidate keypoints. A Laplacian value calculation module 302 calculates, for each candidate keypoint, a first Laplacian value ($L_u$) for pixels in an upper Scale Space and a second Laplacian value ($L_l$) for pixels in a lower Scale Space, based on the position of the candidate keypoint. A discarding module 303 discards a candidate keypoint if a Laplacian value $L_c$ of the keypoint position is less than or equal to either of $L_u$ or $L_l$. A Laplacian strength calculation module 304 calculates, in the case that the candidate keypoint is not discarded, the candidate keypoint's Laplacian strength ($L_s$) based on a relative change in Laplacian value from $L_c$ to $L_u$ and from $L_c$ to $L_l$. A selection module 305 selects one or more candidate keypoints as SIFT features based on the corresponding Laplacian strength. Each of these functions will be described more fully below.

Figure 4:
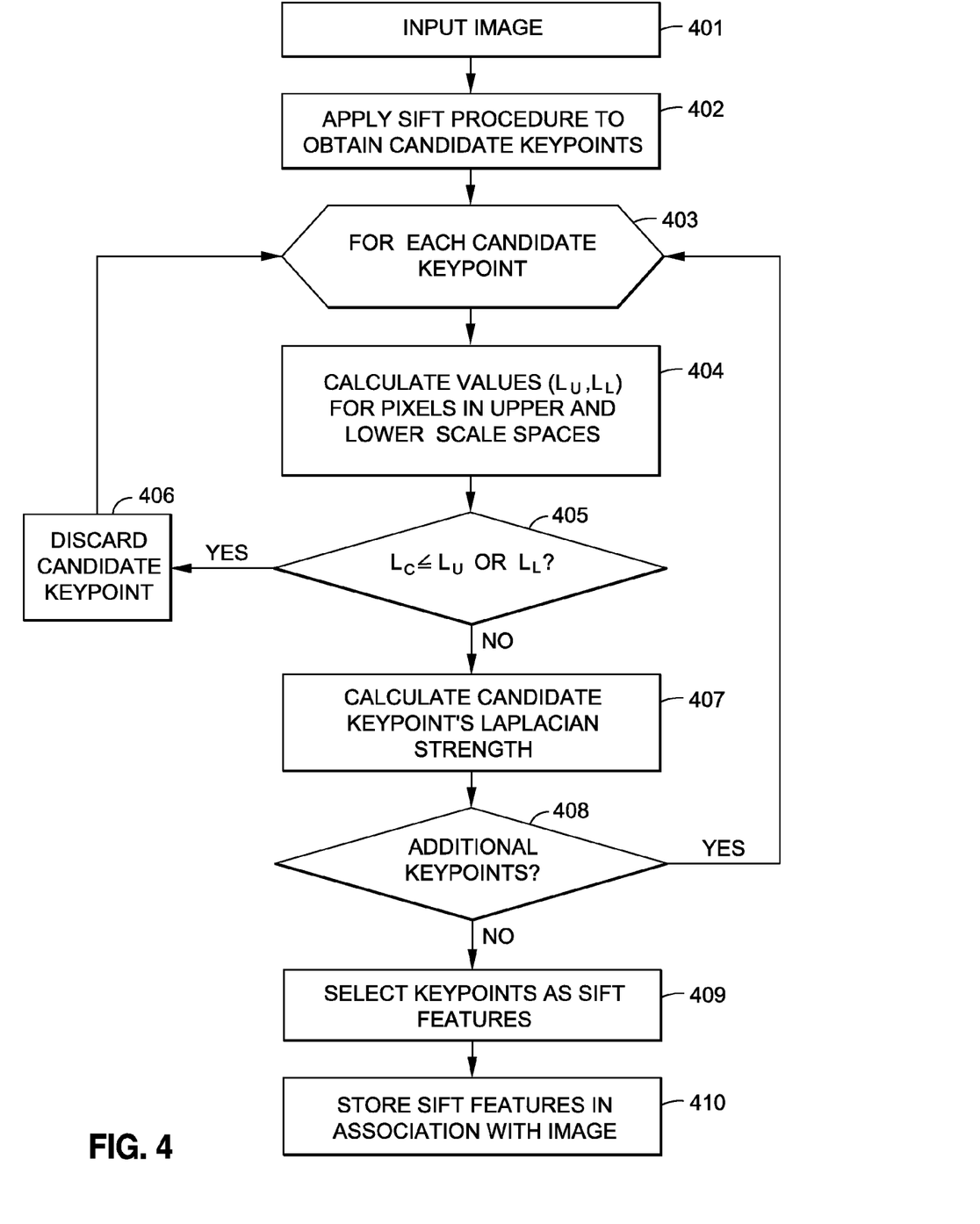
FIG. 4 is a flow diagram for explaining feature selection according to an example embodiment.

FIG. 4 is a flow diagram for explaining feature selection according to an example embodiment.

Briefly, in FIG. 4, SIFT features are selected from an input image. A SIFT procedure is applied to the input image to obtain candidate keypoints. For each candidate keypoint, there is calculation of a first Laplacian value ($L_u$) for pixels in an upper Scale Space and a second Laplacian value ($L_l$) for pixels in a lower Scale Space, based on the position of the candidate keypoint. A candidate keypoint is discarded if a Laplacian value $L_c$ of the keypoint position is less than or equal to either of $L_u$ or $L_l$. In the case that the candidate keypoint is not discarded, the candidate keypoint's Laplacian strength ($L_s$) is calculated, based on a relative change in Laplacian value from $L_c$ to $L_u$ and from $L_c$ to $L_l$. One or more candidate keypoints are selected as SIFT features based on the corresponding Laplacian strength.

In more detail, in step 401, an image is input. An image may be input, for example, by receiving the image over a network via network interface 111, or may retrieved from a storage in memory such as image files 125 on fixed disk 45. Of course, other methods of inputting an image are possible.

In step 402, a SIFT procedure is applied to the input image to obtain candidate keypoints. In that regard, applying a SIFT procedure includes creating Scale Space images (images having a different resolution) from the input image, calculating differential coefficient images of the first order from the Scale Space images, creating an edge mask for each Scale Space image, and performing Gaussian convolution to the edge masked differential coefficient images to calculate a Harris value and select candidate keypoints.

In that regard, as mentioned above, the general SIFT procedure can generate too many feature points for a given input image. In order to effectively control the number of SIFT features generated per image, there is a need for a measure for weighing keypoints against each other, i.e., to prioritize keypoints so that it can be determined which keypoints to keep and which to discard.

Thus, in step 403, a classification process begins for each candidate keypoint.

In step 404, for the current candidate keypoint, there is calculation of a first Laplacian value ($L_u$) for pixels in an upper Scale Space and a second Laplacian value ($L_l$) for pixels in a lower Scale Space, based on the position of the candidate keypoint. The Laplacian value is based on a value (e.g., luminance) of the keypoint and neighboring keypoints. It should be noted that $L_c$ and $L_u$ correspond to the same spatial position as the candidate keypoint, but at different scales (different resolutions).

In that regard, the average values $L_u$ and $L_l$ across the upper and lower scale spaces are calculated because candidate keypoints whose Laplacian values stand out more across different scales (e.g., resolutions) are generally more robustly detected across images. For example, it is better to use a keypoint whose Laplacian value which is high at one scale, but low at all the others. This helps to detect sharp points, not fuzzy ones, along the lines of a signal-to-noise ratio, but between one scale and all other scales.

In step 405, there is a determination of whether a Laplacian value $L_c$ of the keypoint position is less than or equal to either of $L_u$ or $L_l$ calculated in step 404.

If $L_c$ of the keypoint position is less than or equal to either of $L_u$ or $L_l$, the candidate keypoint is discarded in step 406, and the process returns to step 403 to the next candidate keypoint.

Thus, the process gets rid of candidate keypoints whose Laplacian value is less than or equal to either of a Laplacian value ($L_u$) for pixels at some scale higher than the candidate scale, and a Laplacian value ($L_l$) for pixels at some scale lower than the candidate scale. In one example, one scale higher and one scale lower are used, but the disclosure is not limited to this, and more than one scale below or above could be used.

If the candidate keypoint is not discarded, the process proceeds to step 407, where the candidate keypoint's Laplacian strength ($L_s$) is calculated, based on a relative change in Laplacian value from $L_c$ to $L_u$ and from $L_c$ to $L_l$. Put another way, $L_s$ is calculated based not only on the absolute difference from $L_c$ to $L_u$ and $L_l$, but on the relative difference, e.g., the relative magnitude. Using a simple example for purposes of conciseness, if in one example $L_c$ is 10,500 and $L_l$ is 10,000, with a difference of 500 and in a second example $L_c$ is 3 and $L_l$ is 1, then it is the second example which is more important, because the relative change in L is much more.

Accordingly, there are many ways to characterize $L_s$. In one example aspect, $L_s$ is calculated at least in part from $L_u$ and one or more of $L_c/L_u$ and $L_c/L_l$. For example, in one aspect, $L_s$ is calculated by $L_s=(((L_c-L_l)/L_l)+((L_c-L_u)/L_u))/2$. In another example, $L_s$ is calculated by $L_s=[L_c-\max(L_l, L_u)]/\max(L_l, L_u)$. In still another example, $L_s$ is calculated by $L_s=[L_c-\min(L_l, L_u)]/\min(L_l, L_u)$. In yet another example, $L_s$ is calculated by $L_s=L_c/\max(L_l, L_u)$.

In step 409, there is a selection of the remaining keypoints as SIFT features. This selection may be accomplished by a number of methods. In one method, the keypoints are sorted by descending Laplacian strength ($L_s$ value). The keypoints can then be filtered by selecting the top ranked keypoints as SIFT features.

Thus, in one example, the candidate keypoint is added to a list of keypoints sorted by descending Laplacian strength. In another example, a number of top ranked keypoints are selected from the list. In yet another example, the number of keypoints selected from the list is a specified percentage of the total number of keypoints. In still another example, the number of keypoints selected from the list is a predetermined fixed maximum number of keypoints. In one example, the predetermined fixed maximum number of keypoints is based on user input.

In step 410, the selected SIFT features are stored in association with the input image. For example, the selected SIFT features and the image can be stored in image files/SIFT features 125 on fixed disk 45. Of course, the selected SIFT features and the image could also be transmitted and stored elsewhere, or otherwise output.

Once the keypoints (i.e., SIFT features) are selected and stored in association with an image, they can be used for a number of practical purposes. For example, the stored features can be compared to extracted features of other images to determine if the images match. Thus, in one aspect, the selected keypoints are used to search for a corresponding image, as described more fully below with respect to FIG. 6.

Figure 5:
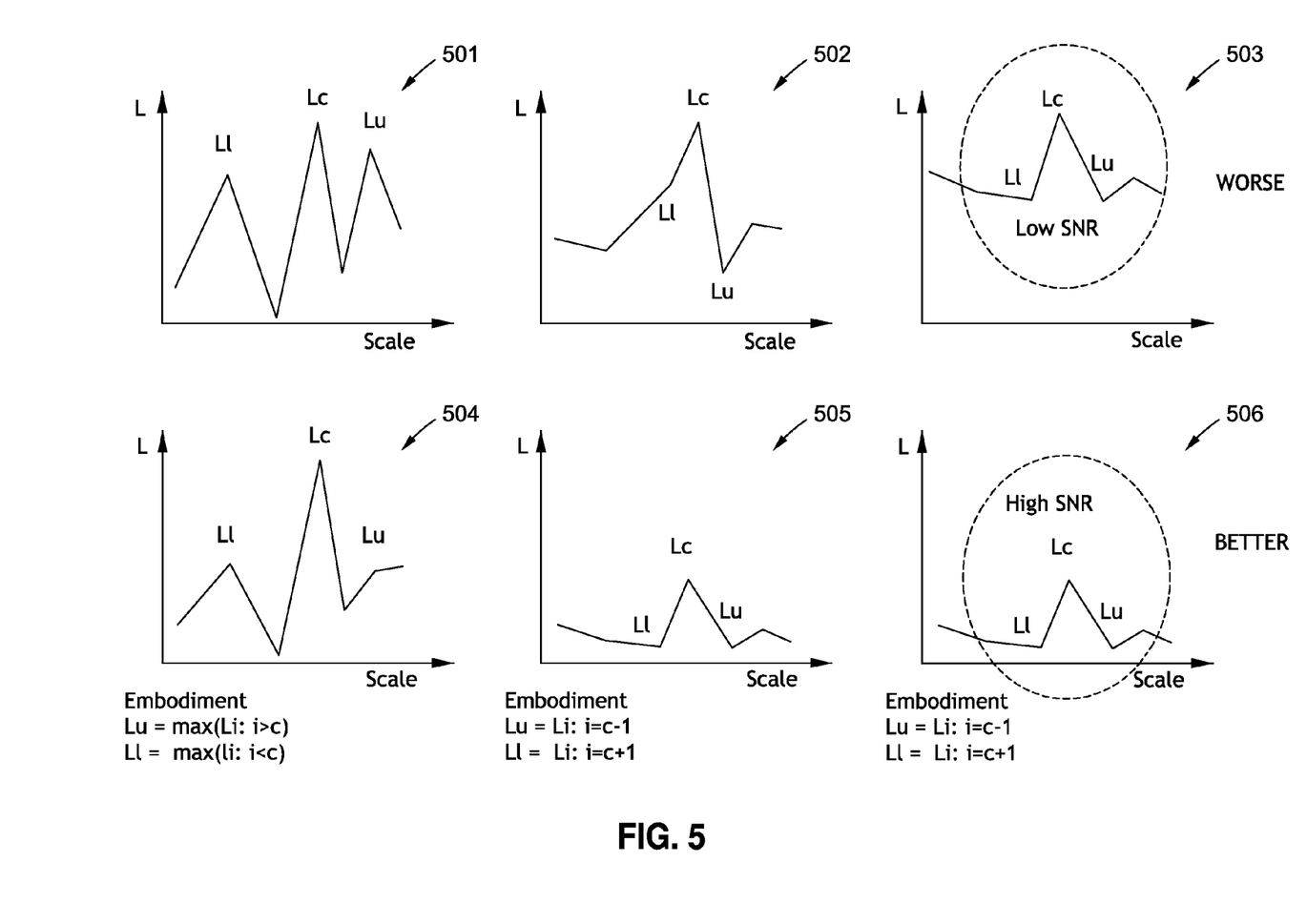
FIG. 5 is a view for explaining change in Laplacian values according to an example embodiment.

FIG. 5 a view for explaining change in Laplacian values according to an example embodiment.

As shown in FIG. 5, it can be seen that as scale changes, there is a peak for $L_c$ relative to $L_l$ and $L_u$.

As mentioned above, any point is only considered (i.e., is not discarded) if it is larger than the value that came before it and the value that came after it (in scale). Moreover, the Laplacian strength $L_s$ of a candidate keypoint is calculated based on the relative difference from $L_c$ to $L_u$ and $L_l$, e.g., the relative magnitude of change. In the example shown in FIG. 5, $L_l$ is only one scale below and $L_u$ is only one scale above, but it should be understood that more than one scale below or above could be used.

Referring again to FIG. 5, graphs 501, 502, 503, 504, 505 and 506 depict some examples of different relative changes between $L_c$, $L_u$ and $L_l$. As shown in FIG. 5, a better keypoint has a better relative change between $L_c$ and $L_u$ and $L_l$, e.g., where $L_u$ and $L_l$ are relatively low Laplacian values relative to $L_c$.

In particular, 503 and 506 illustrates that the absolute difference between the $L_c$ and $L_u$ and $L_l$ does not determine the Laplacian strength. For example, even though $L_c-L_l$ and $L_c-L_u$ are the same for both 503 and 506, in graph 503, $L_l=50$; $L_c=100$; $L_u=48$, with $L_s=1.04$, whereas in graph 506, $L_l=10$; $L_c=60$; $L_u=8$, and $L_s=11.5$ Graphs 502 and 505 make a similar point as above, but with $L_c-L_u$ much larger for 502 than for 505, but with the Lapacian strength better for 505.

Graphs 501 and 504 illustrate the case where the $L_u$ and $L_l$ are not from immediate neighbor scales (but from the largest values from lower and upper scales).

By classifying SIFT features based on Laplacian strength and filtering out lower ranked features, it is ordinarily possible to reduce the amount of required memory and processing power, and to thereby improve performance.

In that regard, an example below illustrates the effect of increasing the amount of SIFT features used. In this example, the percentage of SIFT features used were varied via a parameter RT (reduction threshold). For example, RT=25 signifies that the top 25% of the original SIFT features are used.

The results showed that increasing the amount of SIFT features increases slightly the accuracy achieved.

|  | RT = 25 | | RT = 50 | | RT = 75 | | RT = 100 | |
| --- | --- | --- | --- | --- | --- | --- | --- | --- |
|  | Totals | Per Image | Totals | Per Image | Totals | Per Image | Totals | Per Image |
| Index Size (MB) | 27.91 |  | 39.14 |  | 49.96 |  | 60.79 |  |
| Image Count: | 1015 |  | 1015 |  | 1015 |  | 1015 |  |
| Match one: | 992 | 97.73% | 995 | 98.03% | 995 | 98.03% | 1000 | 98.52% |
| Top match: | 941 | 92.71% | 941 | 92.71% | 952 | 93.79% | 950 | 93.60% |
| Search time(s): | 34.573 | 0.034 | 46.247 | 0.046 | 56.953 | 0.056 | 65.8 | 0.065 |
| Feature extraction time(s): | 402.823 | 0.397 | 407.487 | 0.401 | 409.575 | 0.404 | 412.955 | 0.407 |

Based on the above results, it can be seen that the proposed approach provides an effective trade-off between search index size and search time versus search accuracy. For example, one experiment enabled a composite feature (using two different types of local image features) based search on 20M images in under 1 second search time on a 30 machine cluster.

Figure 6:
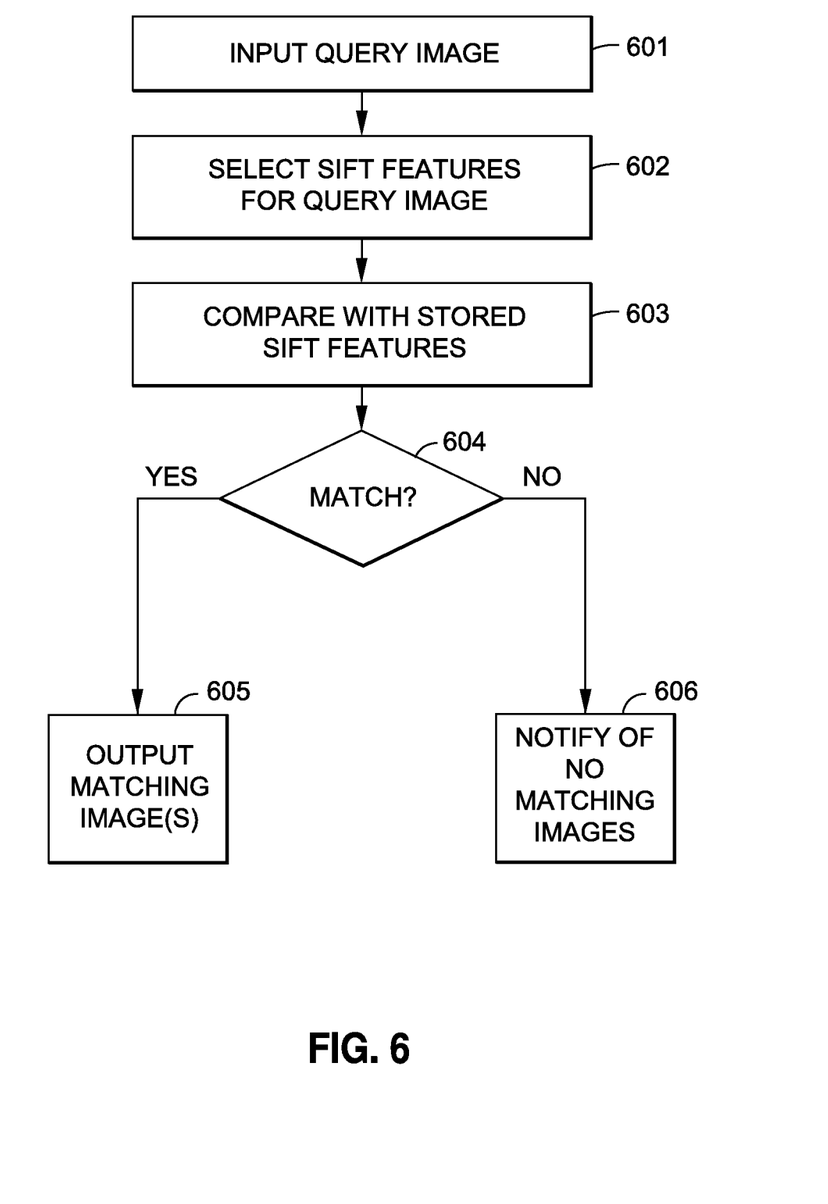
FIG. 6 is a flow diagram for explaining an image search according to an example embodiment.

FIG. 6 is a flow diagram for explaining an image search according to an example embodiment.

In step 601, a query image is input. The query image is an image upon which the search is based. For example, a user may input a query image as a search target in order to determine whether one or more images matching the query image are stored in a database (e.g., image files/SIFT features 125).

In step 602, SIFT features are selected for the query image, in accordance with the process described above with respect to FIG. 4. As a result, SIFT features associated with the query image can be used to search for matching images. Specifically, the SIFT features associated with the query image can be compared against the SIFT features associated with other images.

Thus, in step 603, the SIFT features for the query image are compared with stored SIFT features associated with other images. For example, the SIFT features for the query image are compared with SIFT features stored in a database such as image files/SIFT features 125 on fixed disk 45.

In step 604, there is a determination of whether the SIFT features for the query image match any stored SIFT features. If there is a match, the process proceeds to step 605. If there is not a match, the process proceeds to step 606.

In step 605, the stored images or their respective references that match the query image (by virtue of matching SIFT features) are output. For example, file names of the matching images, thumbnail images, or the matching images themselves, may be displayed on display screen 42 or otherwise output.

On the other hand, if no matching images are found, a notification to that effect is provided in step 406.

In addition to image retrieval, SIFT features (or at least keypoint detection used with SIFT features) might also be used for tracking or optical flow type applications. In these applications, motion of the camera or objects in a stream of images may be determined by finding keypoints or matching SIFT features in the neighborhood of previously detected keypoints. The change in position of these keypoint locations may indicate a 3 dimensional motion of the camera or objects in the scene or both. ps <Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), microdrive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for selecting SIFT features from an input image, the method comprising:
    applying a SIFT procedure to the input image to obtain candidate keypoints;
    calculating, for each candidate keypoint, a first Laplacian value (Lu) for pixels in an upper Scale Space and a second Laplacian value (Ll) for pixels in a lower Scale Space, based on the position of the candidate keypoint;
    discarding a candidate keypoint if a Laplacian value Lc of the keypoint position is less than or equal to either of Lu or Ll;
    calculating, in the case that the candidate keypoint is not discarded, the candidate keypoint's Laplacian strength (Ls) based on a relative change in Laplacian value from Lc to Lu and from Lc to Ll; and
    selecting one or more candidate keypoints as SIFT features based on the corresponding Laplacian strength.

2. The method according to claim 1, wherein Ls is calculated at least in part from Lu and one or more of Lc/Lu and Lc/Ll.

3. The method according to claim 2, wherein Ls is calculated by $Ls=(((Lc-Ll)/Ll)+((Lc-Lu)/Lu))/2$.

4. The method according to claim 2, wherein Ls is calculated by $Ls=[Lc-\max(Ll, Lu)]/\max(Ll, Lu)$.

5. The method according to claim 2, wherein Ls is calculated by $Ls=[Lc-\min(Ll, Lu)]/\min(Ll, Lu)$.

6. The method according to claim 2, wherein Ls is calculated by $Ls=Lc/\max(Ll, Lu)$.

7. The method according to claim 1, wherein the candidate keypoint is added to a list of keypoints sorted by descending Laplacian strength.

8. The method according to claim 7, wherein the selection comprises selecting a number of top ranked keypoints from the list.

9. The method according to claim 8, wherein the number of keypoints selected from the list is a specified percentage of the total number of keypoints.

10. The method according to claim 8, wherein the number of keypoints selected from the list is a predetermined fixed maximum number of keypoints.

11. The method according to claim 10, wherein the predetermined fixed maximum number of keypoints is based on user input.

12. The method according to claim 1, wherein the selected keypoints are used to search for a corresponding image.

13. An apparatus for selecting SIFT features from an input image, comprising:
    a computer-readable memory constructed to store computer-executable process steps; and
    a processor constructed to execute the process steps stored in the memory,
    wherein the process steps cause the processor to:
    apply a SIFT procedure to the input image to obtain candidate keypoints;
    calculate, for each candidate keypoint, a first Laplacian value (Lu) for pixels in an upper Scale Space and a second Laplacian value (Ll) for pixels in a lower Scale Space, based on the position of the candidate keypoint;
    discard a candidate keypoint if a Laplacian value Lc of the keypoint position is less than or equal to either of Lu or Ll;
    calculate, in the case that the candidate keypoint is not discarded, the candidate keypoint's Laplacian strength (Ls) based on a relative change in Laplacian value from Lc to Lu and from Lc to Ll; and
    select one or more candidate keypoints as SIFT features based on the corresponding Laplacian strength.

14. The apparatus according to claim 13, wherein Ls is calculated at least in part from Lu and one or more of Lc/Lu and Lc/Ll.

15. The apparatus according to claim 14, wherein Ls is calculated by $Ls=(((Lc-Ll)/Ll)+((Lc-Lu)/Lu))/2$.

16. The apparatus according to claim 14, wherein Ls is calculated by $Ls=[Lc-\max(Ll, Lu)]/\max(Ll, Lu)$.

17. The apparatus according to claim 14, wherein Ls is calculated by $Ls=[Lc-\min(Ll, Lu)]/\min(Ll, Lu)$.

18. The apparatus according to claim 14, wherein Ls is calculated by $Ls=Lc/\max(Ll, Lu)$.

19. The apparatus according to claim 13, wherein the candidate keypoint is added to a list of keypoints sorted by descending Laplacian strength.

20. A non-transitory computer-readable storage medium storing computer-executable process steps for causing a machine to perform a method for selecting SIFT features from an input image, the method comprising:
    applying a SIFT procedure to the input image to obtain candidate keypoints;
    calculating, for each candidate keypoint, a first Laplacian value (Lu) for pixels in an upper Scale Space and a second Laplacian value (Ll) for pixels in a lower Scale Space, based on the position of the candidate keypoint;
    discarding a candidate keypoint if a Laplacian value Lc of the keypoint position is less than or equal to either of Lu or Ll;
    calculating, in the case that the candidate keypoint is not discarded, the candidate keypoint's Laplacian strength (Ls) based on a relative change in Laplacian value from Lc to Lu and from Lc to Ll; and
    selecting one or more candidate keypoints as SIFT features based on the corresponding Laplacian strength.

* * * * *